(12) United States Patent
Papakipos et al.

(10) Patent No.: US 10,038,885 B2
(45) Date of Patent: Jul. 31, 2018

(54) CONTINUOUS CAPTURE WITH AUGMENTED REALITY

(71) Applicant: Facebook, Inc., Menlo Park, CA (US)

(72) Inventors: Matthew Nicholas Papakipos, Palo Alto, CA (US); Michael John McKenzie Toksvig, Palo Alto, CA (US); Erick Tseng, San Francisco, CA (US); Yoon Kean Wong, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 432 days.

(21) Appl. No.: 13/654,212

(22) Filed: Oct. 17, 2012

(65) Prior Publication Data

US 2014/0105580 A1   Apr. 17, 2014

(51) Int. Cl.
*H04N 9/80*       (2006.01)
*H04N 9/806*      (2006.01)
*H04N 5/77*       (2006.01)

(52) U.S. Cl.
CPC .......... *H04N 9/806* (2013.01); *H04N 5/772* (2013.01)

(58) Field of Classification Search
USPC ................................................. 386/239–248
See application file for complete search history.

(56) References Cited

U.S. PATENT DOCUMENTS

| 8,375,310 | B2 | 2/2013 | Hamilton | |
|---|---|---|---|---|
| 8,478,716 | B2 | 7/2013 | Flinn | |
| 8,924,465 | B1* | 12/2014 | Tunguz-Zawislak | H04N 21/00 709/203 |
| 2008/0220820 | A1 | 9/2008 | Foxenland | |
| 2008/0294663 | A1* | 11/2008 | Heinley | G06F 3/0481 |
| 2009/0003662 | A1 | 1/2009 | Joseph | |
| 2009/0176509 | A1 | 7/2009 | Davis | |
| 2009/0234842 | A1* | 9/2009 | Luo et al. | 707/5 |
| 2010/0145695 | A1 | 6/2010 | Jung et al. | |
| 2010/0205203 | A1* | 8/2010 | Anderson et al. | 707/769 |

(Continued)

FOREIGN PATENT DOCUMENTS

| CN | 102103697 | 6/2011 |
|---|---|---|
| JP | 2009230565 | 10/2009 |

(Continued)

OTHER PUBLICATIONS

U.S. Appl. No. 13/654,084, filed Oct. 17, 2012, Papakipos.

(Continued)

*Primary Examiner* — Hung Dang
(74) *Attorney, Agent, or Firm* — Baker Botts L.L.P.

(57) ABSTRACT

In one embodiment, a method includes receiving one or more audio/visual recordings from a user, the audio/visual recordings continuously capturing audio/visual information around the user, the audio/visual recordings being made by a client computing device of the user automatically and without manual user input and with one or more sensors of the client computing device; processing the audio/visual recordings to extract one or more audio/visual segments, each audio/visual segment covering a specific time period or relating to a specific event in the user's life; and posting the audio/visual segments to one or more points, respectively, along a timeline corresponding to the user's life.

19 Claims, 8 Drawing Sheets

(56) References Cited

U.S. PATENT DOCUMENTS

| | | | |
|---|---|---|---|
| 2010/0325218 A1 | 12/2010 | Castro | |
| 2011/0038512 A1 | 2/2011 | Petrou | |
| 2011/0150340 A1 | 6/2011 | Gotoh | |
| 2011/0159890 A1 | 6/2011 | Fortescue | |
| 2011/0164163 A1 | 7/2011 | Bilbrey | |
| 2011/0182485 A1* | 7/2011 | Shochat | G06K 9/00221 382/118 |
| 2011/0238755 A1 | 9/2011 | Kahn | |
| 2011/0271213 A1* | 11/2011 | Newman et al. | 715/758 |
| 2012/0096357 A1* | 4/2012 | Folgner et al. | 715/726 |
| 2012/0166532 A1 | 6/2012 | Juan | |
| 2012/0166533 A1 | 6/2012 | Rubinstein | |
| 2012/0250950 A1 | 10/2012 | Papakipos | |
| 2012/0254735 A1 | 10/2012 | Levien et al. | |
| 2012/0259842 A1 | 10/2012 | Oman | |
| 2013/0013595 A1 | 1/2013 | Tseng | |
| 2013/0202274 A1* | 8/2013 | Chan | 386/362 |

FOREIGN PATENT DOCUMENTS

| | | |
|---|---|---|
| JP | 2011176599 | 9/2011 |
| JP | 2012058838 | 3/2012 |
| KR | 10-2012-0001175 A | 1/2012 |
| WO | 2011-011616 A1 | 1/2011 |

OTHER PUBLICATIONS

U.S. Appl. No. 13/654,138, filed Oct. 17, 2012, Papakipos.
U.S. Appl. No. 13/654,186, filed Oct. 17, 2012, Papakipos.
U.S. Appl. No. 13/654,229, filed Oct. 17, 2012, Papakipos.
"Project Glass," https://plus.google.com/+projectglass, downloaded Oct. 17, 2012.
Woodyard, Chris, "Latest Tech Gear Turns Police into RoboCop," Sci-Tech Today.com, http://www.sci-tech-today.com/news/High-Tech-Gear-Creates-Future-Cops/story.xhtml?story_id=10100AJB9RM1, Oct. 17, 2012.
Pogue, David, Pogue's Posts, "Google Glass and the Future of Technology," http://pogue.blogs.nytimes.com/2012/09/13/google-glass-and-the-future-of-technology/?p . . . , Sep. 13, 2012, downloaded Oct. 17, 2012.
"Project Glass," Wikipedia, http://en.wikipedia.org/wiki/Project_Glass, downloaded Oct. 17, 2012.
"RoboCop," Wikipedia, http://en.wikipedia.org/wiki/Robo_Cop, downloaded Oct. 17, 2012.
RoboCop Image, http://www.ionlywatch18s.com/?p=1130, downloaded Oct. 17, 2012.
RoboCop Anatomy, http://pichaus.com/science-anatomy-comic-design-@25444296e4d0ac5b1071cb19293a2c40/, downloaded Oct. 17, 2012.
RoboCop Image, http://www.beyondhollywood.com/jose-padilhas-version-ofrobocop-will-document-the-creation-process/robocop-movie-image-2/, downloaded Oct. 17, 2012.
International Search Report and Written Opinion for Int'l App. No. PCT/US2013/065437, dated Jan. 28, 2014.
European Patent Office Search Report and Written Opinion for Application No. 13188926.3-1955, dated Feb. 28, 2014.
Non-Final Office Action for U.S. Appl. No. 13/654,084, dated Aug. 29, 2014.
Scott Stillman, et al., "A system for tracking and recognizing multiple people with multiple cameras," Technical Report GIT-GVU-93-12, XX, XX, XP009097239, pp. 1-6, Dec. 1, 1998.
Office Action for U.S. Appl. No. 13/654,229, dated Apr. 7, 2015.
Office Action for U.S. Appl. No. 13/654,186, dated Apr. 7, 2015.
Office Action for U.S. Appl. No. 13/654,138, dated Apr. 6, 2015.
Office Action for U.S. Appl. No. 13/654,084, dated Apr. 6, 2015.
Extended European Search Report for EP Application No. 13188926.3, dated Feb. 28, 2014.
Communication pursuant to Article 94(3) EPC for EP Application No. 13 188 926.3-1955, dated Jun. 15, 2015.
Office Action received from the Mexican Institute of Industrial Property (IMPI) for Mexican Patent Application No. MX/a/2015/004848, dated Aug. 3, 2016.
Communication of Result of Substantive Examiner for International Application No. MX/a/2015/004848 (with English translation), dated Feb. 21, 2017.
Notification of the First Office Action for CN Application No. 2013800542511 (with English translation), dated Aug. 3, 2017.
Summons to Attend Oral Proceedings Pursuant to Rule 115(1) EPC for Application No. 13188926.3-1871, dated Aug. 17, 2017.
S. Stillman et al., "A System for Tracking and Recognizing Multiple People with Multiple Cameras", Georgia Institute of Technology, Graphics, Visualization and Usability Center, Aug. 25, 1998.
E. Hjelamas et al. "Face Detection: A Survey", Computer Vision and Image Understanding, Apr. 17, 2001.
R. Mautz et al., "Survey of Optical Indoor Positioning Systems", IEEE, Sep. 21, 2011.
Notification of Reasons for Rejection for JP Application No. 2015-537821 (with English translation), dated Nov. 21, 2017.
EP Brief Communication for Application No. 13188926.3-1217, dated Feb. 16, 2018.
Notification of the Second Office Action for CN Application No. 201380054251.1 (with English translation), dated Apr. 2, 2018.
Decision to Refuse for EP Application No. 13 188 926.3-1217, dated May 2, 2018.
Minutes in Accordance with Rule 124(4) for EP Application No. 13 188 926.3-1217, dated May 2, 2018.

* cited by examiner

CONTINUOUS CAPTURE WITH AUGMENTED REALITY

TECHNICAL FIELD

This disclosure generally relates to augmented reality.

BACKGROUND

Augmented reality (AR) is considered an extension of virtual reality (VR) and is about augmenting the real world environment with virtual information to improve people's senses and skills. AR is a live, direct or indirect, view of a physical, real-world environment whose elements are augmented by computer-generated sensory input.

SUMMARY OF PARTICULAR EMBODIMENTS

Particular embodiments may identify individual people around a user and then provide information about the identified individuals to the user. A person may be identified using various techniques, such as voice or facial recognition. A person's voice or face may be captured by audio/visual devices on the user's body or attached to a room where the user and the person are located. The information about an identified individual may be retrieved from that individual's social profile. The information may be displayed to the user (e.g., on a mobile device) or spoken to the user (e.g., whispered in the user's ear).

Particular embodiments may identify individual people around a user and then filter the identified individuals based on social information. A person may be identified using various techniques, such as voice or facial recognition. A person's voice or face may be captured by audio/visual devices on the user's body or attached to a room where the user and the person are located. The social information about an identified individual may be retrieved from that individual's social profile. The identified individuals may be grouped into specific categories (e.g., women who are single, people who are in a specific profession, people who share a common interest, etc.). Those people belonging to a specific category may be shown to the user (e.g., displayed or spoken to the user).

Particular embodiments may identify individual people around a user and then automatically identify a person-of-interest to the user without requiring the user to manually select that person-of-interest. A person may be identified using various techniques, such as voice or facial recognition. A person's voice or face may be captured by audio/visual devices on the user's body or attached to a room where the user and the person are located. The person-of-interest may be identified based on the user's behavior. For example, the user may stare at a person or stand next to a person for a while or engage in conversation with a person. This causes the person to be identified as of particular interest to the user. Information (e.g., social information) about the person-of-interest may be shown to the user. The social information about the person-of-interest may be retrieved from that person's social profile. The information may be displayed (e.g., on a mobile device) or spoken to the user (e.g., whispered in the user's ear).

Particular embodiments may determine a person's presence at a more granular level. Global Positioning System (GPS) and check-in information enables a system to determine a person's presence in a general area (e.g., inside a building), but not more specific locations (e.g., in a specific room of the building). When a group of users are located within an area (e.g., inside a room), each user's mobile device may send information (e.g., voice recordings or facial images) about people around him/her to a server. The server may identify the people (e.g., through voice or facial recognition) then determine the specific position of each user in the room as well as relative positions of multiple users. The server can send guidance information to lead a user to another user, or tell a user where another user is in the room.

Particular embodiments may continuously capture audio/visual information around a user. The user may wear an audio/visual recording device that captures audio/visual information continuously (e.g., one frame every two seconds). The captured audio/visual information may be uploaded to a server and processed. For example, interesting audio/visual segments may be posted to the user's timeline or save for the user for later viewing. In particular embodiments, a user can query the audio/visual information for what happened at a particular time or during a particular event. In particular embodiments, the audio/visual information may be posted to an Open Graph or social graph associated with a social-networking system.

DESCRIPTION OF EXAMPLE EMBODIMENTS

Augmented reality (AR) is about augmenting the real world environment with virtual information to improve people's senses and skills. In particular embodiments, the information may be retrieved from a social-networking system.

Figure 1:
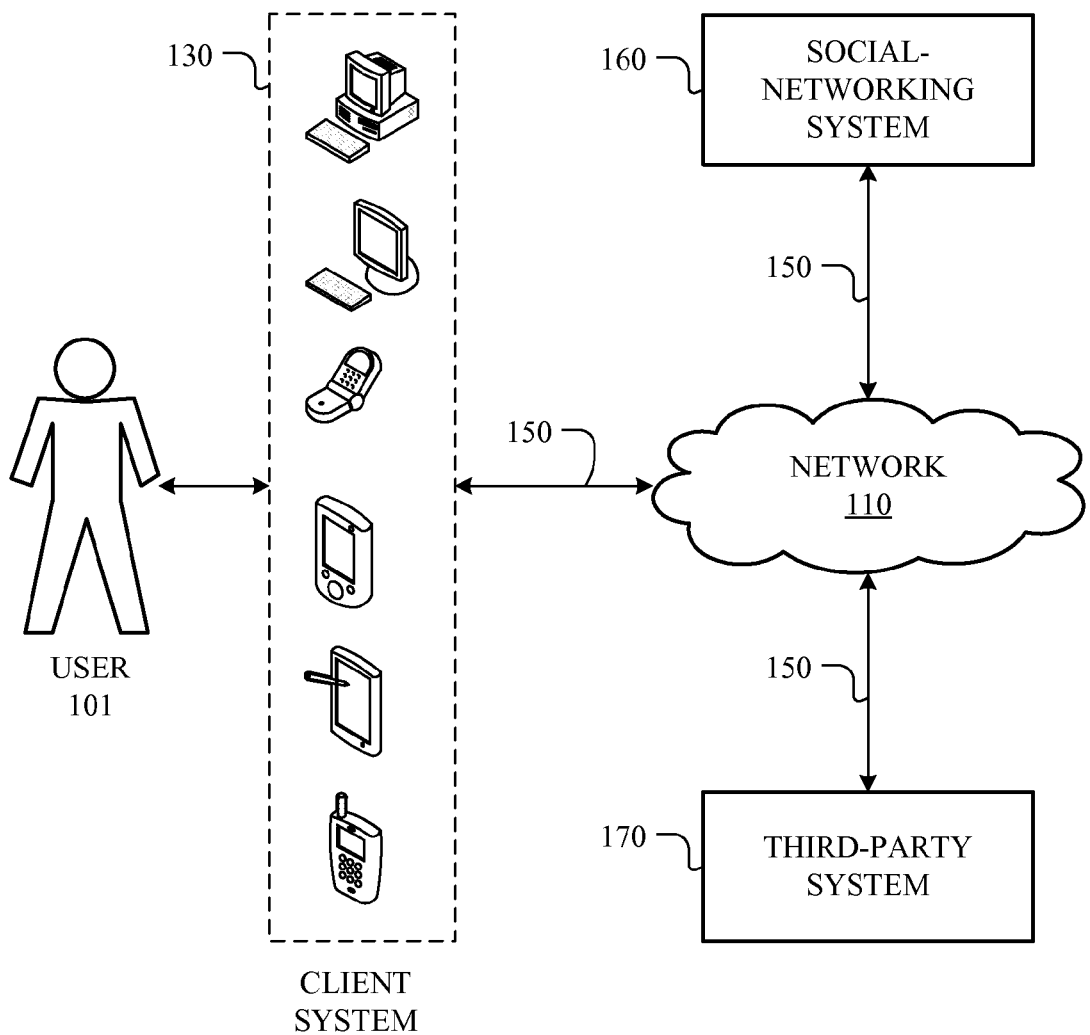
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various software applications. Third-party system 170 may generate, store, receive, and transmit various types of data, such as, for example, data associated with the third-party applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a Smartphone, or a tablet computer.

In particular embodiments, client system 130 may be a mobile computing device, such as a Smartphone, tablet computer, or laptop computer, which may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, various types of data or information may be stored in social-networking system 160. For example, each user of social-networking system 160 has a user profile, where information (e.g., demographic information, education, profession, hobbies, etc.) about the user may be stored. In addition, social connections among users, user activities, user postings and uploads (e.g., images), and other types of information may also be stored in social-networking system 160. With particular embodiments, information of social-networking system 160 may be stored in a graph structure having any number of nodes and edges. The graph may be referred to as social graph or open graph, partly because it is used to store, among others, social information.

Figure 2:
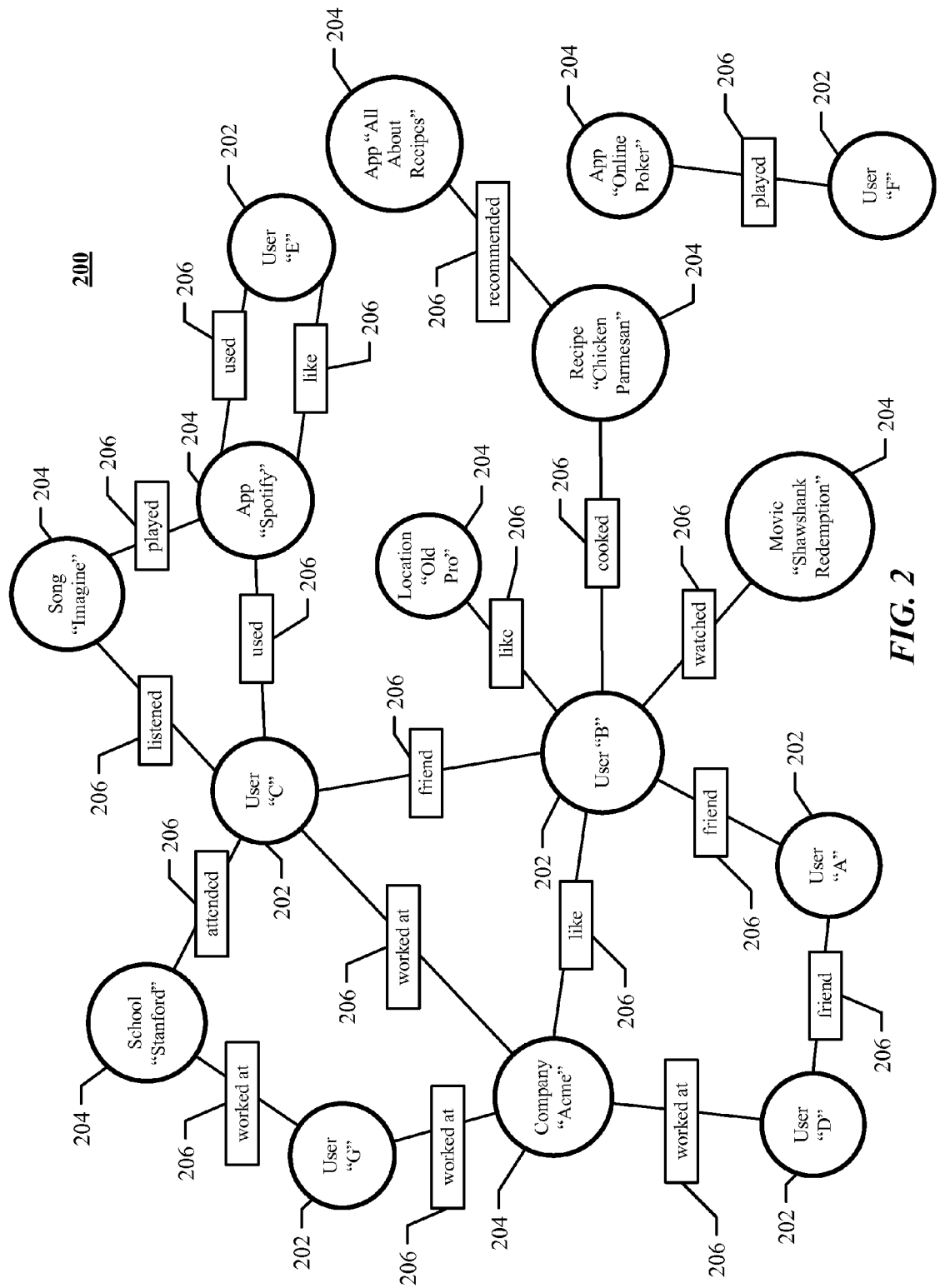
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Information available from social-networking system 160 may be used to augment realities for specific individuals. For example, suppose that a group of people are gathered together at a place. It may be a meeting, a social function (e.g., birthday party, wedding) or gathering, or an event (e.g., concert, sports event). It may be helpful to provide information about the individual persons present to each other. In some cases, if a person is a user of social-networking system 160, information about that person may be retrieved from social-networking system 160 (e.g., from the person's user profile at social-networking system 160 or social graph 200).

Figure 3:
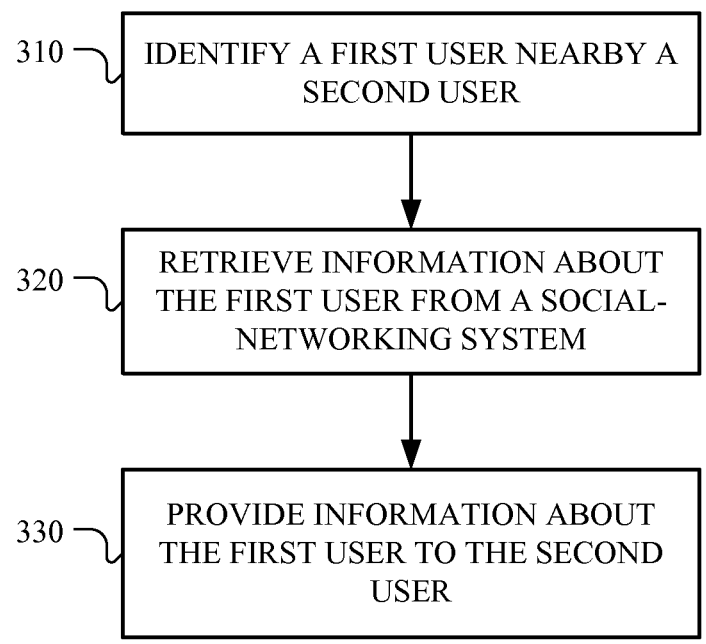
FIG. 3 illustrates an example method for providing information about a first user, which is retrieved from a social-networking system, to a second user when the first user is nearby the second user.

FIG. 3 illustrates an example method 300 for providing information about a first user to a second user when the first user is nearby the second user. Note that the steps illustrated in FIG. 3 may be repeated to provide information about different first users to a second user. Suppose that a group of users, including at least a first user and a second user, are gathered together at a place. The place may be a room inside a building or house, a business establishment (e.g., club, restaurant, shop), a public space (e.g., street corner, park), and so on. This disclosure contemplates any suitable place for human gathering. Further suppose that the first user is nearby the second user. Note that the word "nearby" does not mean that the first user and the second user are necessarily next to each other. Instead, it is sufficient that the second user is in close spatial proximity to the first user or the second user is aware of the first user's presence (e.g., the second user can see or hear the first user even from a distance away).

At STEP 310, particular embodiments may identify the first user, subject to the first user's privacy settings. For example, the first user is identified only when the first user's privacy settings indicate that the first user consents to be identified. There are different ways to identify a user, and this disclosure contemplates any suitable techniques for identifying a person.

With some implementations, the first user may be identified through facial recognition. In this case, an image of the first user's face may be taken with a visual recording device (e.g., camera or video recorder), again subject to the first user's privacy settings (i.e., the first user's image is taken only when the first user's privacy settings indicate that the first user consents to have his image taken). The image of the first user's face may be processed and compared against images of people with known identities to determine the identity of the first user. For example, if the first user is a member of social-networking system 160, the image of the first user's face may be sent to social-networking system 160 and compared against profile or other images (e.g., images from user albums) of users of social-networking system 160. If a match is found, the name of the user whose profile image matches the image of the first user's face should also be the name of the first user.

With some implementations, the first user may be identified through voice recognition. In this case, a recording of the first user's voice may be taken with an audio recording device (e.g., voice or video recorder, microphone), subject to the first user's privacy settings (i.e., the first user's voice is recorded only when the first user's privacy settings indicate that the first user consents to have his voice recorded). The recording of the first user's voice may be processed and compared against voice recordings of people with known identities to determine the identity of the first user. For example, if the first user is a member of social-networking system 160, the recording of the first user's voice may be sent to social-networking system 160 and compared against voice recordings of users of social-networking system 160. If a match is found, the name of the user whose voice recording matches the recording of the first user's voice should also be the name of the first user.

To further improve the result of facial or voice recognition, with some implementations, information stored in social graph 200, especially social connections among users of social-networking system 160 and check-in information, may be used. Suppose that the second user is a member of social-networking system 160. When comparing the image of the first user's face against images of people with known identities or comparing the recording of the first user's voice against voice recordings of people with known identities, the search pool (i.e., the people with known identities among whom to search for the identity of the first user) may be limited to, for example and without limitation: (1) friends of the second user (i.e., users of social-networking system 160 who are directly connected with the second user according to social graph 200), (2) friends of friends of the second user (i.e., users of social-networking system 160 who are indirectly connected with the second user through one other user according to social graph 200), (3) users of social-networking system 160 who have checked in at the same location as the second user, (4) friends of the second user who are not checked in at some other location different from where the second user is and who have not recently checked in at somewhere far away from the location where the second user is (e.g., friends of the second user who have not checked in at somewhere more than 60 miles away from the location where the second user is within the past couple of hours), (5) people with known identifies and have good template information (e.g., good audio recording or facial image) where the voice or facial recognition algorithm can provide a more accurate result, or (6) any combination of above. Other applicable criteria may also be used to limit the search pool. In addition, to protect user privacy, the search pool may exclude those people who have set their privacy rules to prevent themselves from being automatically recognized in such situations (i.e., to remove themselves from identity recognition results).

There are different ways to obtain an image of a user's face or a recording of a user's voice for the purpose of identifying the user, and this disclosure contemplates any suitable techniques for obtaining a user's facial image or voice recording. As an example, the second user may have an audio or visual recording device and use such a device to take an image of the first user's face (e.g., while the first user is facing the second user) or make a recording of the first user's voice (e.g., while the first user is speaking) or both. The audio/visual recording device (e.g., camera, microphone) may take any form, and this disclosure contemplates any suitable audio/visual recording devices. For example, the recording device may be incorporated in a Smartphone, a piece of jewelry (e.g., pendant, brooch), a wrist watch, or a pair of glasses carried or worn by the second user so that it is not obtrusive. As another example, if the first user and the second user are within an enclosure, such as a room in a house or building, there may be audio/visual recording devices installed around the room (e.g., on the walls or in the ceiling of the room). Each recording device may take audio/visual recordings of the users in close proximity to that device. In both cases, the visual recording device may incorporate fisheye lens for taking wide-angle images.

With some implementations, the first user may be identified through a mobile device carried by the first user, subject to the first user's privacy settings. As an example, when the first user carries a Smartphone, the location of the Smartphone may be determined by wireless signals (e.g., through triangulation) or Global Positioning System (GPS) sensor data. The location of the first user may be derived from the location of the first user's Smartphone. In some cases, if the first user is a member of social-networking system 160, the telephone number of the Smartphone carried by the first user may be sent to social-networking system 160 and compared against cellular telephone numbers of users (e.g., found in user profiles) of social-networking system 160. If a match is found, the name of the user whose cellular phone number matches the phone number of the first user's Smartphone should, in most situations, also be the name of the first user. In other cases, the telephone number of the Smartphone carried by the first user may be checked against appropriate phone company records to determine the name of the owner of the telephone number, which, in most situations, should be the name of the first user. As another example, when the first user carries a Bluetooth device (e.g., a headphone) that has a unique identifier, the Bluetooth device may be used to identify the first user. In most situations, the name of the known owner of the Bluetooth device should be the name of the first user.

With some implementations, the first user may be identified through actions the first user performs in connection with social-networking system 160 while at the gathering, subject to the first user's privacy settings. For example, if the first user has performed a "check-in" action with social-networking system 160 upon arriving at the gathering, it indicates that the first user is present at the gathering. This information may be cross-referenced with other available information (e.g., "check-in" actions performed by other users at the same gathering, social connections of the first user) to identify the first user.

To ensure that the first user is accurately identified, particular embodiments may employ a combination of suitable identification methods. For example, the first user may be identified through both facial and voice recognition, through both voice recognition and the mobile device carried by the first user, and so on.

In some embodiments, the identification of the first user may be performed by a computing device (e.g., a server) of social-networking system 160. In this case, information (e.g., facial image or voice recording of the first user, identifier of the mobile device carried by the first user) may be sent to the computing device of social-networking system 160, which in turn identifies the first user. In other embodiments, the identification of the first user may be performed by a mobile device of the second user. For example, the second user's Smartphone may capture an image of the first user's face and perform facial recognition, or take a recording of the first user's voice and perform voice recognition. If necessary, the second user's Smartphone may obtain appropriate information from social-networking system 160 in order to help with the identification effort.

Once the identity (e.g., name, user identifier (ID) at social-networking system 160) of the first user is determined, at STEP 320, particular embodiments may retrieve information about the first user from social-networking system 160. With some implementations, the information about the first user may be retrieved from the first user's profile with social-networking system 160, such as the first user's background, profession, job, hobbies, interests, marital status, and so on. With some implementations, the information about the first user may be retrieved from the social graph or open graph (e.g., social graph 200) of social-networking system 160. For example, the first user's social connections (e.g., friends, families), social interactions (e.g., between the first user and other users of social-networking system 160), online activities (e.g., communications, posts, file uploads, web sites visited, etc.), or mobile activities (e.g., check-ins, phone calls, texts, etc.) may be retrieved from social graph 200.

To protect privacy of the first user, with some implementations, the information about the first user retrieved from social-networking system 160 is only the specific information accessible to the general public or the second user is authorized to access (e.g., based on friend connections). Information the second user is not authorized to access (e.g., private information) is not retrieved. What specific information about the first user is accessible to the second user may be determined based on privacy settings specified in the first user's account at social-networking system 160.

At STEP 330, particular embodiments may provide the information about the first user to the second user (e.g., while both the first user and the second user are at the gathering). There are different ways to provide information to a user, and this disclosure contemplates any suitable techniques for providing information to a user.

With some implementations, the information about the first user may be displayed on the screen of a mobile device (e.g., a Smartphone) carried by the second user. For example, the information may be presented together with a facial image of the first user. With some implementations, the information about the first user may be whispered to the second user (e.g., through an earphone worn by the second user or the speaker of a mobile device carried by the second user). The volume of the sound may be sufficiently low so that only the second user can hear the information about the first user.

Figure 4:
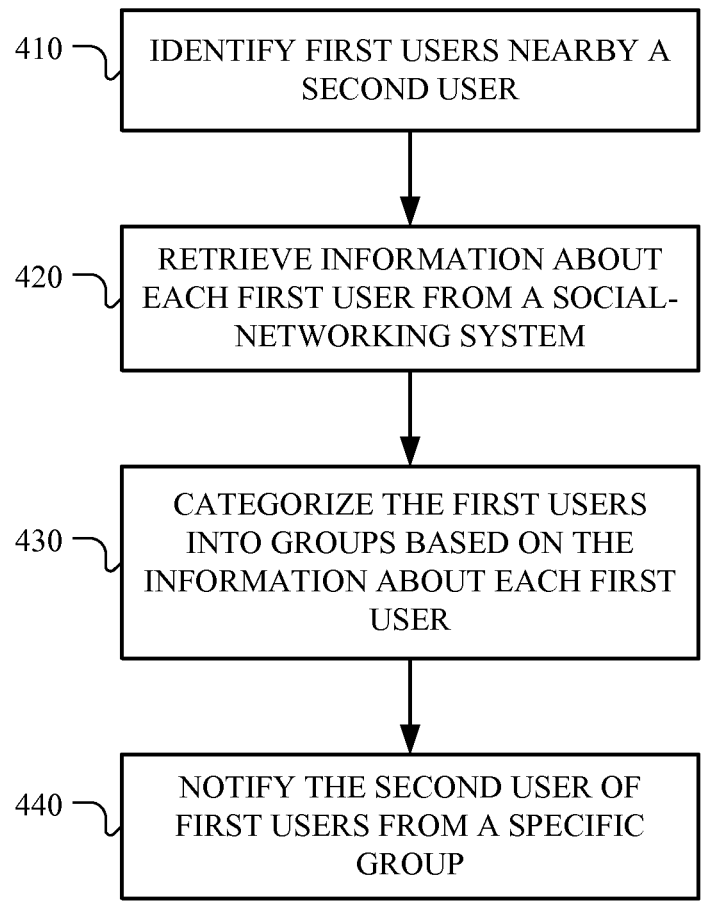
FIG. 4 illustrates an example method for providing information about a group of first users, which is retrieved from a social-networking system, to a second user when the first users are nearby the second user.

When multiple users are gathered together (e.g., at a social or professional function), the users may be identified and then categorized (e.g., based on similarities among the users). FIG. 4 illustrates an example method 400 for providing information about a group of first users to a second user when the first users are nearby the second user. Suppose that a group of users, including one or more first users and a second user, are gathered together at a place. Again, the place may be a room inside a building or house, a business establishment (e.g., club, restaurant, shop), a public space (e.g., street corner, park), and so on. This disclosure contemplates any suitable place for human gathering. Further suppose that the first users are nearby the second user (i.e., the second user is aware of the first users' presence because, for example, the second user is able to see or hear the first users).

At STEP 410, particular embodiments may identify each first user nearby the second user, subject to each first user's privacy settings. In particular embodiments, each first user may be identified using similar techniques as described above in connection with STEP 310 of FIG. 3.

Once the identity (e.g., name, user ID at social-networking system 160) of each first user is determined, at STEP 420, particular embodiments may retrieve information about each first user from social-networking system 160. In particular embodiments, the information about each first user may be retrieved using similar techniques as described above in connection with STEP 320 of FIG. 3.

At STEP 430, particular embodiments may categorize the first users into one or more groups based on information about the first users, subject to each first user's privacy settings (i.e., specific information about each first user is used for categorizing the first users only when each first user's privacy settings indicate that the information can be used, such as public information of each first user). There are different ways to categorize a group of users, and this disclosure contemplates any suitable techniques for user categorization.

With some implementations, the first users may be categorized based on similarities among the first users or similarities between the first users and the second user. As an example, the first users may be categorized based on their professions (e.g., engineers, doctors, lawyers, teachers, etc.), their hobbies (e.g., stamp collection, photography, cooking, sailing, etc.), their genders (e.g., female, male), their relationship status (e.g., single, married, divorced, etc.), their age groups, and so on, subject to each first user's privacy settings. As another example, the first users may be categorized based on whether they share some common interests with the second user (e.g., if the second user likes fishing, all first users who also like fishing may be grouped together), or whether they work at the same company as the second user, or whether they have attended the same university as the second user, of whether they are in the same age group as the second user, and so on, subject to each first user's privacy settings. As a third example, the first users may be categorized based on affinity or coefficient values associated with the first users and the second user. With some implementations, an affinity value may be computed between each first user and the second user, which measures the relationship between each first user and the second user. With some implementations, an affinity value may be computed between each first user and a subject as well as between the second user and that same subject. Affinity is described in more detail in U.S. patent application Ser. No. 11/503,093, which is hereby incorporated by reference in its entirety.

With some implementations, the first users may be categorized based on criteria specified by the second user. As an example, if the second user is hoping to find a suitable date at the gathering, the second user may specify criteria such as female, between the ages of 25 and 35, single or divorced, and interested in pursuing romantic relationships. Then, all first users that meet these criteria may be categorized into the same group. As another example, if the second user (e.g., a business woman) wishes to build professional networks at the gathering, the second user may specify criteria such as corporate executive officers, or having advanced degrees in business or finance. Then, all first users that meet these criteria may be categorized into the same group. As a third example, if the second user is interested in finding a partner with whom to play tennis, the second user may specify criteria such as interested in tennis, playing tennis at least once a week, and an advanced tennis player. Again, all first users that meet these criteria may be categorized into the same group.

At STEP 440, particular embodiments may notify the second user those specific first users that belong to a specific group. Note that STEP 440 may be repeated to notify the second user of specific first users from different groups. In particular embodiments, the second user may be notified using similar techniques as described above in connection with STEP 330 of FIG. 3. As an example, the name and image of each first user from the group may be displayed on the screen of a mobile device (e.g., a Smartphone) of the second user so that the second user can use the images to identify the real persons nearby and match each name with a face. As another example, the name and brief description of each first user from the group may be whispered to the second user (e.g., through an earphone worn by the second user).

With some implementations, information (e.g., information retrieved from social-networking system 160) about each first user or about selected first users from the group may be provided to the second user. As an example, suppose that the gathering is held at a nightclub and the second user is interested in finding a date. The names and images of those first users that satisfy the dating criteria specified by the second user may be presented to the second user. After examining these images, the second user may be especially interested in three specific first users. Then, additional information (e.g., profession, interests, hobbies, education background, etc.) about each of these three first users may be presented to the second user so that the second user can make a choice among them. As another example, suppose that the second user is interested in meeting people at influential positions. The names and images of those first users that satisfy the professional networking criteria (e.g., corporate executive officers) specified by the second user may be presented to the second user. In addition, for each of these first users, information about the first user, such as the company the first user currently works for, the current position held by the first user at the company, the education or career history of the first user, and so on, may be presented to the second user so that the second user can determine with which specific first users to make contact.

Figure 5:
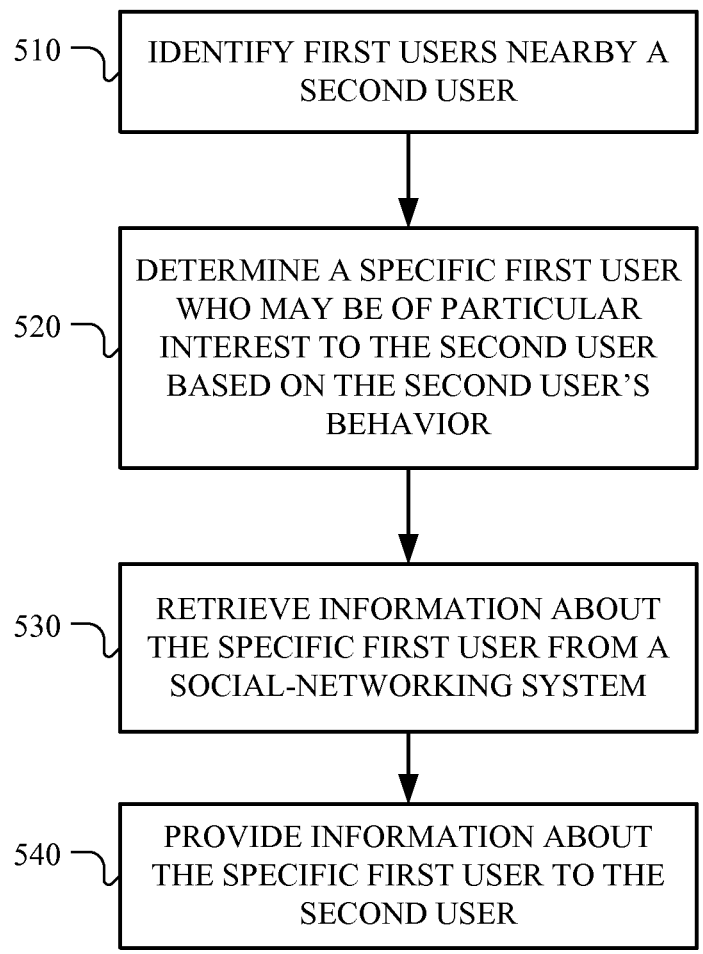
FIG. 5 illustrates an example method for automatically identifying a first user who is of particular interest to a second user based on behavior of the second user.

When multiple users are gathered together (e.g., at a social or professional function), one user may be especially interested in another user and wishes to find out more information about that other user. FIG. 5 illustrates an example method 500 for automatically identifying a first user who is of particular interest to a second user based on behavior of the second user. Note that the steps illustrated in FIG. 5 may be repeated to identify different first users who are of particular interest to a second user. Suppose that a group of users, including one or more first users and a second user, are gathered together at a place. For example, the place may be a room inside a building or house, a business establishment (e.g., club, restaurant, shop), a public space (e.g., street corner, park), and so on. This disclosure contemplates any suitable place for human gathering. Further suppose that the first users are nearby the second user (i.e., the second user is aware of the first users' presence because, for example, the second user is able to see or hear the first users).

At STEP 510, particular embodiments may identify each first user nearby the second user, subject to each first user's privacy settings. In particular embodiments, each first user may be identified using similar techniques as described above in connection with STEP 310 of FIG. 3.

At STEP 520, particular embodiments may identify a specific first user who may be of particular interest to the second user based on behavior of the second user. In other words, it is not necessary for the second user to perform an explicit action for the specific purpose of pointing out (e.g., to a computing system) which first user is a person of interest to the second user. Instead, the first user, who may be of particular interest to the second user, is identified implicitly through the second user's behavior. There are different user behaviors that may be used to identify a person of interest to a user and this disclosure contemplates any applicable user behaviors.

With some implementations, the positions of the individual users at the gathering may be determined (described in more detail below in connection with FIG. 6). When the second user remains (e.g., standing or sitting) in close proximity of (e.g., next to) a specific first user for a threshold period of time (e.g., one minute), that first user may be identified as of particular interest to the second user. For example, a mobile device carried by the second user may include an accelerometer, which may be used to measure the proper acceleration of the mobile device and thus of the second user. This may be used to determine whether the second user is moving or remaining still at any given moment. Thus, if the second user is positioned next to a specific first user and remains still there for the threshold period of time, that first user may be automatically identified as of particular interest to the second user.

With some implementations, the movements of the second user's eyes may be tracked (e.g., through retina tracking). Eye tracking is the process of measuring either the point of gaze or the motion of a person's eye relative to the person's head. There are various eye tracking devices, which measure eye positions and eye movements, and this disclosure contemplates any applicable eye tracking devices. As an example, the second user may wear special contact lenses with embedded mirror or magnetic field sensors. Movements of the eyes may be measured based on movements of the contact lenses. As another example, the second user may wear a pair of glasses with a video camera or optical sensor. Light (e.g., infrared) reflected from the eyes are sensed by the video camera or optical sensor, and eye rotations are extracted based on changes in the reflections. When the second user looks at a specific first user for a threshold period of time (e.g., 30 seconds), that first user may be identified as of particular interest to the second user. Alternatively, when the second user blinks his or her eyes for a threshold number of times (e.g., three times in a row) while looking at a specific first user, that first user may be identified as of particular interest to the second user.

With some implementations, the second user may carry a mobile device that includes an audio recording device. The audio recording device may continuously capture voices around the second user. When the second user engages in conversation with or speaks to a specific first user for a threshold period of time (e.g., 30 seconds), that first user may be identified as of particular interest to the second user. Alternatively, when the second user speaks a predefined word (e.g., information) while standing or sitting next to a specific first user, that first user may be identified as of particular interest to the second user.

To improve the accuracy of identifying a specific first user who is of particular interest to the second user, particular embodiments may employ a combination of suitable identification methods. For example, the first user may be identified when the second user both stares at the first user for a threshold period of time and speaks a predefined word, or when the second user both stands next to the first user for a threshold period of time and blinks for a threshold times.

Once a specific first user who is of particular interest to the second user has been identified automatically, at STEP 530, particular embodiments may retrieve information about the specific first user from social-networking system 160. In particular embodiments, the information about the specific first user may be retrieved using similar techniques as described above in connection with STEP 320 of FIG. 3.

At STEP 540, particular embodiments may provide the second user with the information about the specific first user, who is of particular interest to the second user. In particular embodiments, the information about the specific first user may be provided using similar techniques as described above in connection with STEP 330 of FIG. 3. For example, the information about the specific first user may be displayed on the screen of a mobile device (e.g., a Smartphone) of the second user or audibly communicated to the second user (e.g., through an earphone worn by the second user).

The information about the specific first user may, for example, help the second user in socializing with the specific first user. Suppose that the second user has never met the specific first user prior to the present gathering and wishes to introduce himself or herself to the specific first user. If the second user knows that the specific first user is interested in sports and especially golf, the second user may select "golf" as a conversation topic when chatting with the specific first user.

For the methods illustrated in FIGS. 3, 4, and 5, particular embodiments may consider that there is an association or connection between the specific first user or users (e.g., the first user of particular interest to the second user, or the first users from a specific group) and the second user. Recommendations or advertisements may be provided to the second user based on such association or connection. For example, if the first users all share a common interest (e.g., tennis) with the second user, brands of tennis equipments (e.g., apparels, balls, racquets) preferred by the first users may be recommended to the second user.

Figure 6:
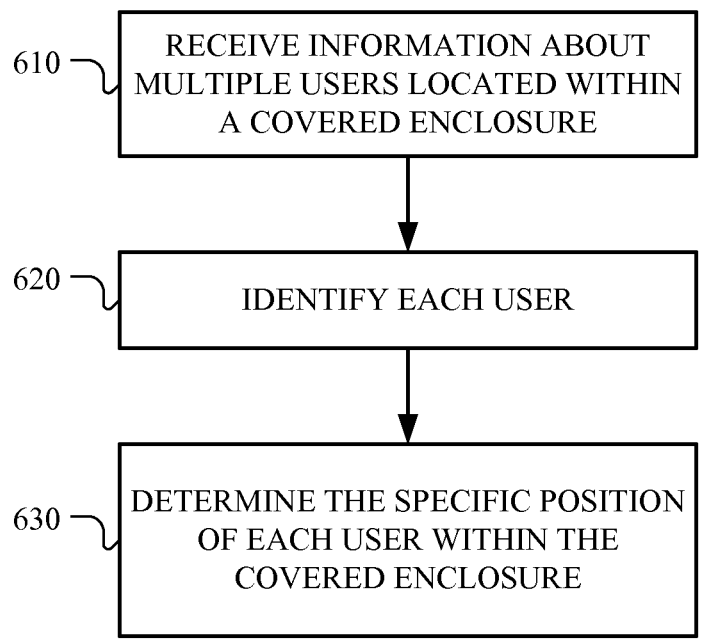
FIG. 6 illustrates an example method for determining specific positions of individual users within an enclosure.

In particular embodiments, the processes illustrated in FIGS. 4-6 may be symmetrically applied to multiple users. For example, while Users X and Y are both attending an event, both Users X and Y may be identified (e.g., using similar techniques as described above in connection with STEP 310 of FIG. 3), and information about both Users X and Y may be retrieved (e.g., from social-networking system 160). Thereafter, information about User X may be provided to User Y, while information about User Y may be provided to User X.

In particular embodiments, the processes illustrated in FIGS. 4-6 may be asymmetrically applied to multiple users. For example, while Users X and Y are both attending an event, both Users X and Y may be identified (e.g., using similar techniques as described above in connection with STEP 310 of FIG. 3), and information about both Users X and Y may be retrieved (e.g., from social-networking system 160). Thereafter, information about both Users X and Y is provided to User Z, and yet information about User Z is not provided to either User X or User Y. For example, user Z may be a host of the event. User Z can then decide whether to introduce Users X and Y to each other (e.g., based on their respective information). This may help protect Users X's and Y's privacy (e.g., by not providing their information to complete strangers).

Currently, various types of information, such as GPS coordinates of a user's mobile device or a user's check-ins, may be used to determine the general location of a user at a given time. For example, a user's check-ins may indicate that the user is inside a building (e.g., a restaurant, an office building, a shopping mall, etc.) but does not tell which specific room, or which specific position in a room the user is located at a given time. FIG. 6 illustrates an example method 600 for determining specific positions of individual users within an enclosure. Suppose that a group of users are gathered inside an enclosure. This disclosure contemplates any suitable enclosure for human gathering. In particular embodiments, the enclosure is a covered enclosure, such as a single room within a structure.

At STEP 610, particular embodiments receive information about the users located inside the enclosure, subject to each user's privacy settings. There are various ways to gather information about users inside an enclosure, and this disclosure contemplates any applicable techniques to gather information about users inside an enclosure.

With some implementations, some or all of the users may carry mobile devices that include visual recording devices. For example, a visual recording device may be incorporated in a Smartphone, a piece of jewelry (e.g., pendant, brooch), a wrist watch, or a pair of glasses carried or worn by a user so that it is not obtrusive. In some cases, a visual recording device may have a wide-angle lens (e.g., fisheye lens) capable of taking wide angle images (e.g., panoramic or hemispherical images). A user may take various photos of other users inside the enclosure with such a visual recording device and send the photos to, for example, social-networking system 160. Moreover, multiple users may take multiple photos around the enclosure and send these photos to social-networking system 160.

With some implementations, there may be visual recording devices installed around the enclosures (e.g., on the walls, in the ceilings). These visual recording devices may take photos of their respective areas of the enclosure and send these photos to social-networking system 160.

With some implementations, social-networking system 160 may receive photos taken by the visual recording devices carried by the individual users as well as installed around the enclosure.

Different photos may capture different users inside the enclosure. For example, some photos may capture only a few users (e.g., one, two, or three users) while other photos may capture many users at a time. The same user may be captured in multiple photos. Some photos may capture background around the enclosure.

At STEP 620, particular embodiments may identify the individual users captured in various photos. In particular embodiments, each individual user may be identified using similar techniques as described above in connection with STEP 310 of FIG. 3. More specifically, with some implementations, the users may be identified through facial recognition. In this case, the facial image of each specific user captured in the photos may be processed using suitable computer software (e.g., image processing software). For example, if the user is a member of social-networking system 160, the image of the user's face may be compared against profile or other images (e.g., images from user albums) of users of social-networking system 160. With some implementations, the search pool may be limited to specific users of social-networking system 160, as described above in connection with STEP 310 of FIG. 3, to improve facial recognition results or protect user privacy. If a match is found, the name of the user whose profile image matches the image of the user's face should also be the name of the first user.

At STEP 630, particular embodiments may determine the specific position of each user inside the enclosure. With some implementations, the positions of the individual users may be extrapolated from the information contained in or associated with the photos. As an example, suppose that a first user has taken a photo of a second user and a third user standing side by side. This photo indicates that the second user is positioned to the third user's right, while the third user is positioned to the second user's left. Furthermore, based on the angle of the photo, it may be determined that the first user is positioned approximately four feet in front of both the second and the third users. As another example, suppose that a fourth user has taken a photo of the second user, a fifth user, and a sixth user. In this photo, the fifth user and the sixth user are both positioned to the second user's right. Since the second user is positioned to the third user's right, this implies that the fifth user and the sixth user are also positioned to the third user's right. Furthermore, the angle of the photo may be used to determine the position of the fourth user in relation to the second, fifth, and sixth users.

Thus, information extracted from multiple photos may be combined and interpolated to determine the specific positions of the individual users inside the enclosure.

Particular embodiments may construct a map of the enclosure and then indicate the position of each user inside the enclosure on the map. Since the users may move around the enclosure, the positions of the users may be updated as needed. With some implementations, photos may be continuously taken inside the enclosure (e.g., by visual recording devices carried on the users or installed around the enclosure) and sent to social-networking system 160. Positions of the users may be repeatedly extrapolated from the latest photos.

The map, with the positions of the individual users, may provide help to the users inside the enclosure. For example, suppose that a first user is trying to locate a second user inside the enclosure. However, because the enclosure is poorly lit or it is crowded inside the enclosure, the first user may not be able to see the second user readily. In this case, the map of the enclosure, with the current position of the second user marked on it, may be provided to the first user (e.g., sent to and displayed on the first user's mobile device) so that the first user can use the information to find the second user. Alternatively, directions may be given to the first user (e.g., spoken to the first user through an earphone) that lead the first user to the second user.

Figure 7:
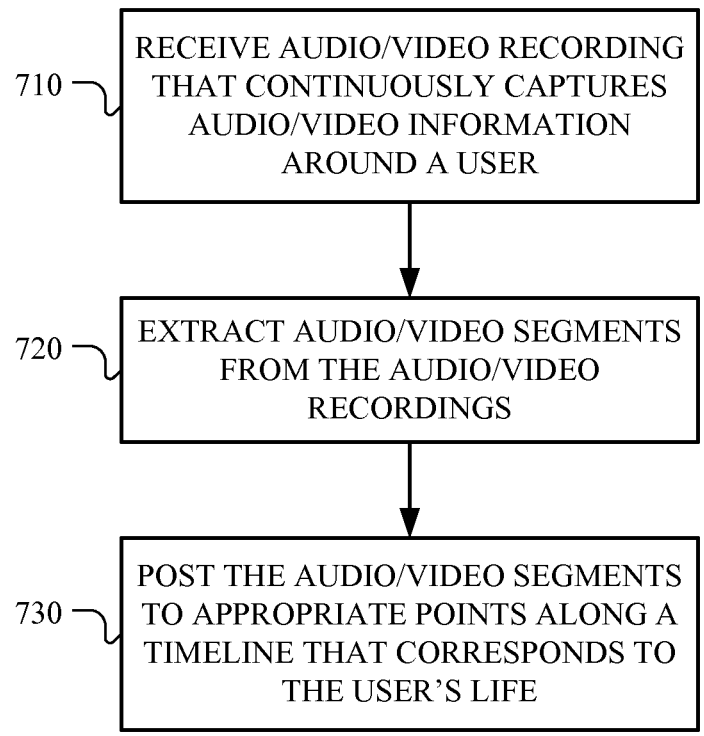
FIG. 7 illustrates an example method for continuously capturing audio/visual information around a user.

A user may carry an audio/visual recording device, and as the user lives through each day, the audio/visual recording device may continuously capture audio/visual information around the user. The recording device may be incorporated in a mobile device carried by the user or a piece of clothing or accessory (e.g., jewelry, eye glasses, watch) worn by the user. FIG. 7 illustrates an example method 700 for continuously capturing audio/visual information around a user. Note that the steps illustrated in FIG. 7 may be similarly repeated for different users.

At STEP 710, an audio/visual recording device may continuously capture audio/visual information around a user as the user lives through each day. As an example, the recording device may capture image frames periodically (e.g., one image per minute or one image per five minutes). As another example, the recording device may capture videos. With some implementations, the rate of recording (e.g., the number of image frames captured per some specific period of time, such as the number of frames captured per minute) may vary as needed. For example, if there are few activities around the user so that there are few changes over time, the images may be recorded at a lower rate (e.g., one image per ten minutes). If there is almost no activity around the user, no image needs to be recorded. However, if there are more activates around the user (e.g., some sudden movements as indicated by the accelerometer or camera), the images may be recorded at a higher rate (e.g., one image per two seconds). Thus, the rate of recording may be automatically adjusted based on the amount of activities or motions or movements around the user or by the user. More movements may result in a higher rate of recording, while few movements may result in a lower rate of recording.

With some implementations, the captured audio/visual information may be sent to a server (e.g., a server of social-networking system 160) for further analysis. Alternatively, with some implementations, the captured audio/visual information may be processed by the user's own device. With some implementations, there may be timestamps associated with the captured audio/visual information, indicating when the information is captured.

At STEP 720, particular embodiments may extract audio/visual segments from the audio/visual information captured by the audio/visual recording device. In practice, a person's daily life is not always full of interesting or significant activities. For example, during normal business hours, the user may spend hours working in his or her office, in which case there may not be much significant information captured by the recording device (e.g., most of the images may have the user working in front of a computer). On the other hand, in the evenings or on the weekends, the user may socialize with friends or relatives, attend concerts or sporting events, watch moves, etc., in which case the information captured by the recording device are related to these activities and thus more interesting to the user. By processing the audio/visual information, audio/visual segments covering specific time periods or relating to specific events in the user's life may be extracted. As an example, if the user has attended a concert, a segment may be extracted that covers the concert, subject to the permissions of the artists or copyrights. As another example, if the user has taken a vacation, one or more segments may be extracted that cover the vacation. As a third example, if the user has hosted a visiting relative for several days, one or more segments may be extracted that cover the time periods the user has spent with the visiting relative.

At STEP 730, particular embodiments may post the audio/visual segments to the user's timeline with social-networking system 160. With some implementations, a timeline is a virtual representation of the user's life, starting from the date, month, or year when the user was first born and continuing onward. There may be specific points along the timeline, corresponding to specific dates or time periods in the user's life. Significant events happening in the user's life may be represented on the timeline at appropriate and corresponding points. For example, a point on the timeline may mark the date when the user graduated from high school, while another point on the timeline may mark the date when the user graduated from college. There may be points on the timeline corresponding to when the user has taken vacations. Similarly, audio/visual segments may be displayed at appropriate points along the timeline, which corresponding to the time periods covered by the audio/visual segments respectively.

In particular embodiments, the audio/visual segments may be posted to social graph 200 of social-networking system 160. Each audio/visual segment may be represented by a node in social graph 200, which is connected to the node representing the user. The relationship between the user and the audio/visual segment may be indicated alone the edge connecting the two nodes respectively representing the user and the audio/visual segment.

In particular embodiments, the audio/visual segments may be stored (e.g., by social-networking system 160). Subsequently, the user may retrieve and review specific segments. With some implementations, the user may send a query requesting audio/visual segments covering a specific time period or event in the user's life. Social-networking system 160 may then locate and send the appropriate segment or segments to the user. With some implementations, the user may send a query asking for specific information that can be found in an audio/visual segment, instead of the segment itself. As an example, if the user has attended a sporting event some years ago with a friend but can no longer remember who that friend was, the user may ask for the identity of that friend at the sporting event. Social-networking system 160 nay locate the appropriate audio/visual segment covering the sporting event, identify the friend (e.g., by processing the individual images and performing facial or voice recognition), and send the name of the friend to the user. As another example, the user may send a query specifying a time period and asking for events occurred during that time period. Social-networking system 160 may locate the appropriate audio/visual segment or segments covering the time period, identify the events, and send the titles of the events to the user.

Particular embodiments may repeat one or more steps of the methods of FIGS. 3-7, where appropriate. Although this disclosure describes and illustrates particular steps of the methods of FIGS. 3-7 as occurring in particular orders, this disclosure contemplates any suitable steps of the methods of FIGS. 3-7 occurring in any suitable orders. Moreover, although this disclosure describes and illustrates particular components, devices, or systems carrying out particular steps of the methods of FIGS. 3-7, this disclosure contemplates any suitable combinations of any suitable components, devices, or systems carrying out any suitable steps of the methods of FIGS. 3-7.

Figure 8:
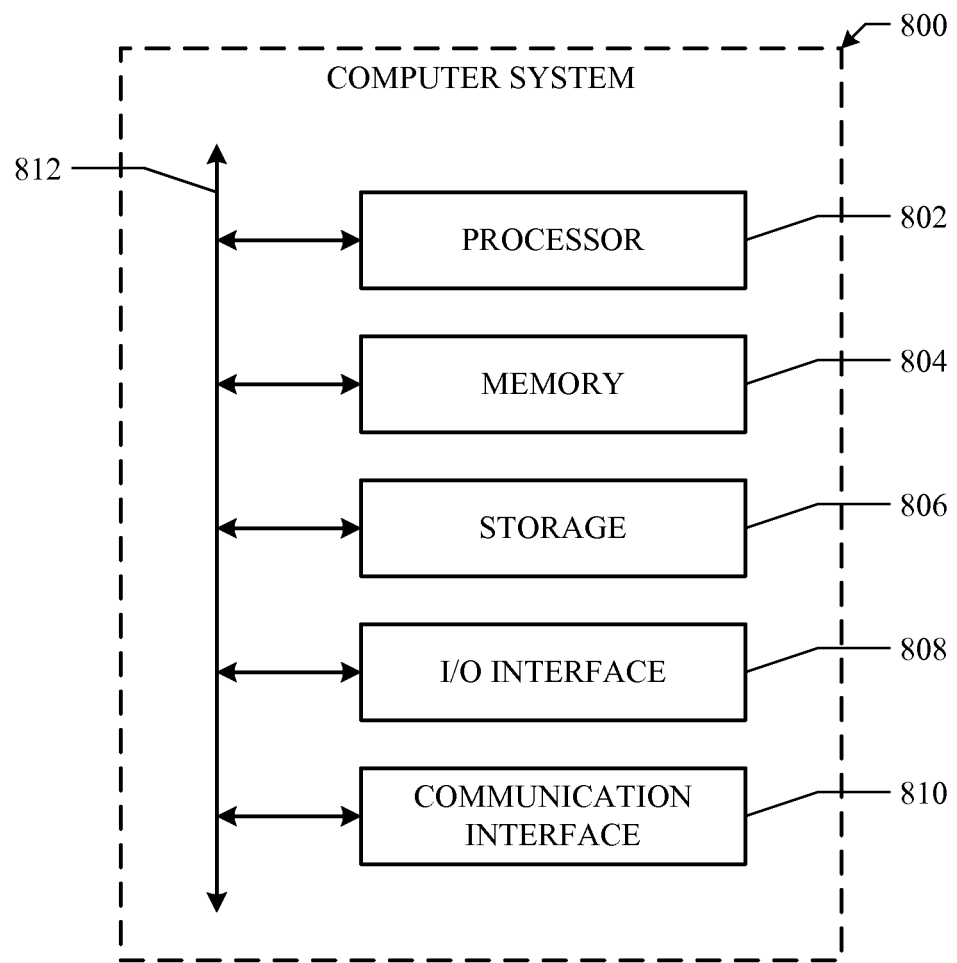
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
   receiving visual and audio information about an environment of a first user of an online social network, wherein the visual and audio information comprises a plurality of images and a plurality of audio segments, each image of the plurality of images comprising a face of a second user of a plurality of second users of the online social network, and wherein the visual information is continuously captured within a specified time period by a sensor of a client computing device of the first user without user input;
   comparing the face in each image of the plurality of images against a database of images, wherein each image of the database of images comprises a face and corresponds to a second user of the plurality of second users of the online social network;
   identifying a specific point along a timeline associated with the first user, the specific point corresponding to a specific event in the life of the first user, wherein the specific point is identified based on a designation of the first user or a location of the environment;
   identifying from the visual and audio information one or more audio/visual segments, each audio/visual segment corresponding to the specific event in the life of the first user, wherein the identification is made by:
      accessing a social graph comprising a plurality of nodes and a plurality of edges, wherein a first node corresponds to the first user, at least one second node corresponds to one of the second users of the plurality of second users, and at least one edge connects the first node to the at least one second node;
      based on the comparing, associating a particular image of the plurality of images with the second node; and
      detecting one or more images or audio segments of the plurality of audio segments that correspond to the at least one second node;
   identifying, for each of the identified audio/visual segments, the specific point along the timeline associated with the first user; and
   generating, for each audio/visual segment, a third node in the social graph and an edge connecting the third node to the first node, wherein the edge indicates a relationship between the first user and the audio/visual segment corresponding to the third node;
   associating each of the audio/visual segments with its corresponding point on the timeline.

2. The method of claim 1, further comprising:
   receiving a query from the first user, the query specifying a time period or an event;
   selecting at least one of the audio/visual segments from the time period or associated with the event; and
   sending the selected audio/visual segments to the user.

3. The method of claim 1, further comprising:
   receiving a query from the first user, the query specifying a time period;
   selecting at least one of the audio/visual segments from the time period;
   identifying one or more persons, other than the user, from the selected audio/visual segments; and
   sending names of the persons to the user.

4. The method of claim 3, further comprising:
   identifying one or more events from the selected audio/visual segments; and
   sending titles of the events to the first user.

5. The method of claim 1, further comprising:
   receiving a query from the first user, the query specifying an event;
   selecting at least one of the audio/visual segments associated with the event;
   identifying one or more persons, other than the first user, from the selected audio/visual segments; and
   sending names of the persons to the first user.

6. The method of claim 1, wherein the visual information is captured by a recording device on the first user's person.

7. The method of claim 1, wherein the method further comprising posting, on a newsfeed of a social network, at least one of the audio/visual segments and a description of the segment's corresponding point on the first user's timeline, the social network comprising a social graph comprising a plurality of nodes and a plurality of edges connecting the nodes, at least one node corresponding to the first user.

8. One or more computer-readable non-transitory storage media embodying software that is operable when executed to:
   receive visual and audio information about an environment of a first user of an online social network, wherein the visual and audio information comprises a plurality of images and a plurality of audio segments, each image of the plurality of images comprising a face of a second user of a plurality of second users of the online social network, and wherein the visual information is continuously captured within a specified time period by a sensor of a client computing device of the first user without user input;
   compare the face in each image of the plurality of images against a database of images, wherein each image of the database of images comprises a face and corresponds to a second user of the plurality of second users of the online social network;
   identify a specific point along a timeline associated with the first user, the specific point corresponding to a specific event in the life of the first user, wherein the specific point is identified based on a designation of the first user or a location of the environment;
   identify from the visual and audio information one or more audio/visual segments, each audio/visual segment corresponding to the specific event in the life of the first user, wherein the identification is made by:
      accessing a social graph comprising a plurality of nodes and a plurality of edges, wherein a first node corresponds to the first user, at least one second node corresponds to one of the second users of the plurality of second users, and at least one edge connects the first node to the at least one second node;
      based on the comparing, associating a particular image of the plurality of images with the second node; and detecting one or more images or audio segments of the plurality of audio segments that correspond to the at least one second node;

identify, for each of the identified audio/visual segments, the specific point along the timeline associated with the first user; and generate, for each audio/visual segment, a third node in the social graph and an edge connecting the third node to the first node, wherein the edge indicates a relationship between the first user and the audio/visual segment corresponding to the third node;

associate each of the audio/visual segments with its corresponding point on the timeline.

9. The media of claim 8, wherein the software is further operable when executed to
receive a query from the first user, the query specifying a time period or an event;
select at least one of the audio/visual segments from the time period or associated with the event; and
send the selected audio/visual segments to the user.

10. The media of claim 8, wherein the software is further operable when executed to
receive a query from the first user, the query specifying a time period;
select at least one of the audio/visual segments from the time period;
identify one or more persons, other than the first user, from the selected audio/visual segments; and
send names of the persons to the first user.

11. The media of claim 10, wherein the software is further operable when executed to
identify one or more events from the selected audio/visual segments; and
send titles of the events to the first user.

12. The media of claim 8, wherein the software is further operable when executed to
receive a query from the first user, the query specifying an event;
select at least one of the audio/visual segments associated with the event;
identify one or more persons, other than the first user, from the selected audio/visual segments; and
send names of the persons to the first user.

13. The media of claim 8, wherein the visual information is captured by a recording device on the first user's person.

14. A system comprising:
one or more processors; and
a memory coupled to the processors comprising instructions executable by the processors, the processors operable when executing the instructions to:
receive visual and audio information about an environment of a first user of an online social network, wherein the visual and audio information comprises a plurality of images and a plurality of audio segments, each image of the plurality of images comprising a face of a second user of a plurality of second users of the online social network, and wherein the visual information is continuously captured within a specified time period by a sensor of a client computing device of the first user without user input;
compare the face in each image of the plurality of images against a database of images, wherein each image of the database of images comprises a face and corresponds to a second user of the plurality of second users of the online social network;
identify a specific point along a timeline associated with the first user, the specific point corresponding to a specific event in the life of the first user, wherein the specific point is identified based on a designation of the first user or a location of the environment;
identify from the visual and audio information one or more audio/visual segments, each audio/visual segment corresponding to the specific event in the life of the first user, wherein the identification is made by:
accessing a social graph comprising a plurality of nodes and a plurality of edges, wherein a first node corresponds to the first user, at least one second node corresponds to one of the second users of the plurality of second users, and at least one edge connects the first node to the at least one second node;
based on the comparing, associating a particular image of the plurality of images with the second node; and
detecting one or more images or audio segments of the plurality of audio segments that correspond to the at least one second node;
identify, for each of the identified audio/visual segments, the specific point along the timeline associated with the first user; and
generate, for each audio/visual segment, a third node in the social graph and an edge connecting the third node to the first node, wherein the edge indicates a relationship between the first user and the audio/visual segment corresponding to the third node;
associate each of the audio/visual segments with its corresponding point on the timeline.

15. The system of claim 14, wherein the processors are further operable when executing the instructions to
receive a query from the first user, the query specifying a time period or an event;
select at least one of the audio/visual segments from the time period or associated with the event; and
send the selected audio/visual segments to the first user.

16. The system of claim 14, wherein the processors are further operable when executing the instructions to
receive a query from the first user, the query specifying a time period;
select at least one of the audio/visual segments from the time period;
identify one or more persons, other than the first user, from the selected audio/visual segments; and
send names of the persons to the first user.

17. The system of claim 16, wherein the processors are further operable when executing the instructions to
identify one or more events from the selected audio/visual segments; and
send titles of the events to the first user.

18. The system of claim 14, wherein the processors are further operable when executing the instructions to
receive a query from the first user, the query specifying an event;
select at least one of the audio/visual segments associated with the event;
identify one or more persons, other than the first user, from the selected audio/visual segments; and
send names of the persons to the first user.

19. The system of claim 14, wherein the visual information is captured by a recording device on the first user's person.

* * * * *